(12) United States Patent
Wick et al.

(10) Patent No.: US 8,185,144 B1
(45) Date of Patent: May 22, 2012

(54) GATEWAY CONTROL SYSTEM AND METHOD USING PUSH-TO-TALK

(75) Inventors: Ryan Wick, Apollo Beach, FL (US); Raymond Reeves, Overland Park, KS (US); Hung Kien Du, Fairfax, VA (US); John Jones, Overland Park, KS (US)

(73) Assignee: Nextel Communications Inc., Reston, VA (US)

( * ) Notice: Subject to any disclaimer, the term of this patent is extended or adjusted under 35 U.S.C. 154(b) by 240 days.

(21) Appl. No.: 12/579,859

(22) Filed: Oct. 15, 2009

(51) Int. Cl.
*H04B 7/00* (2006.01)
(52) U.S. Cl. .................... 455/519; 455/414.1
(58) Field of Classification Search .............. 455/518, 455/519, 415, 420, 426.1, 414.1
See application file for complete search history.

(56) References Cited

U.S. PATENT DOCUMENTS

| | | | |
|---|---|---|---|
| 7,974,650 B2* | 7/2011 | Chowdhury et al. | 455/518 |
| 2006/0104293 A1* | 5/2006 | Kopp et al. | 370/401 |
| 2006/0276213 A1* | 12/2006 | Gottschalk et al. | 455/518 |
| 2009/0233596 A1* | 9/2009 | Calabrese | 455/426.1 |

* cited by examiner

*Primary Examiner* — Tu X Nguyen

(57) ABSTRACT

In a method for managing a target system from a Push-to-Talk station, a Gateway receives a request to manage the target system from the Push-to-Talk station. The request includes an identifier for the Push-to-Talk station and an identifier for the target system. A push-to-talk call session is established between the Push-to-Talk station and the Gateway. A second communication session is established between the target system and the Gateway using an appropriate protocol supported by the target system. The Gateway Transformer translates messages from the Push-to-Talk station into formats and protocols registered for use with the Push-to-Talk station for controlling and querying the target system.

14 Claims, 10 Drawing Sheets

100
GATEWAY CONTROL SYSTEM AND METHOD USING PUSH-TO-TALK

BACKGROUND OF THE INVENTION

Wireless communications systems typically provide interconnect and/or dispatch voice communication services. Interconnect voice communication services are those typically provided by most wireless carriers as circuit-switched communications. Dispatch communication services provide can provide walkie-talkie type half-duplex communications. Examples of systems for providing walkie-talkie like, dispatch communication services are Sprint Nextel Corporation's service identified by the trade name Direct Connect which provides push-to-talk (PTT) communications supported on the Integrated Digital Enhanced Network (iDEN®), and the high performance push-to-talk HPPTT system offered under the trade name QChat.

PTT calls are typically half-duplex communications, and allow communication in one direction at a time. Communications devices for making PTT calls include a press-to-talk button which is pressed to initiate a call to a PTT call recipient. During a PTT call, the push-to-talk button is pressed to request the "floor" of the PTT call and released transmit the communication and to relinquish the floor. While a first caller has the floor, that caller talks, and a call recipient or members of a group of call recipients, cannot talk until the first caller releases the floor. By contrast, interconnect voice calls typically utilize full-duplex communications, and allow parties participating in the call to listen and talk simultaneously. Interconnect calls require setting up a connection between the parties prior to beginning communications, and accordingly do not allow for casual communications to be sent to other parties on the network without first dialing up the parties.

Push-to-talk services such as Direct Connect can support both private PTT communications between a pair of users and PTT communications among a group of users. A PTT device is identifiable in a PTT network by a PTT network address such as a Universal Fleet Member Identifier (UFMI) associated with the Integrated Digital Enhanced Network (iDEN®) or the High-Performance Push-to-talk identifier (HPPTT ID) associated with QChat service.

SUMMARY OF THE INVENTION

Push-to-talk (PTT) services support voice communications between specifically equipped PTT communications devices that include a PTT button. PTT communications devices include a wide range of devices such as personal digital assistants (PDAs), wireless telephones, or other devices, provided that the device implements a button or other interface component to serve as the PTT button.

A PTT communications device may be a sophisticated device that can host applications to supplement communications using a PTT network. For example, a PTT handset might provide a user interface allowing a user to make selections from a menu. Depending upon the menu selection, application software on the handset can transmit tones, such as a Dual-Tone Multi-Frequency (DTMF) signal which can be interpreted by software on a receiving PTT device. In addition to tones, the application software can transmit text messages or utilize any other types of communications supported over the PTT network.

Alternatively, a PTT communications device may be a more simplistic device such as an older generation, minimally equipped PTT handset that has a PTT button for initiating a call that supports voice communications to and from the handset. The simple PTT handset may not have facilities for hosting software as described above.

Because PTT services support communications with wireless communications devices such as PTT handsets, a user may find it desirable to use employ the user's PTT communications device to remotely control appliances and systems belonging to the user. For example, a user desire to remotely control home systems such as a home security system, a heating, ventilation, and air conditioning (HVAC) system, a home lighting system or a security system. Alternatively the user may supervise commercial or business systems such as vending machines or commercial security or HVAC systems. These target systems may be provided with interfaces that allow communicating with the systems over an internet protocol (IP) network or a telephone switching network.

Communications for managing a target system remotely can include requests for information describing the status of the target system, requests to perform one or more operations on the target system, and confirmations of successful completion of a remote operation on the target system. It is desirable that a system for managing a target system accommodate PTT communications devices having limited capabilities as well as being able to exploit functionality on more capable communications devices.

An exemplary method involves receiving a request to manage a target system from a mobile device, the request including an identifier for the mobile device and an identifier for the target system; establishing a push-to-talk call between a gateway and the mobile device in response to the request; determining a protocol for communicating with the target system based on the request; determining a message format for communicating with the target system using the protocol using the request; and establishing a communications link using the determined protocol.

Another exemplary method involves receiving a first identifier for a mobile device; receiving a first identifier for a target system to be controlled from the mobile device; receiving a description of first message content to be transmitted from the mobile device; identifying the format and content of a second message corresponding to the first message to be transmitted to the target system; and storing a correspondence with the first message content and the second message format and content in an account keyed to the first identifier.

Other objects, advantages and novel features of the present invention will become apparent from the following detailed description of the invention when considered in conjunction with the accompanying drawings.

BRIEF DESCRIPTION OF THE DRAWINGS FIGURES

DETAILED DESCRIPTION OF THE ILLUSTRATED EMBODIMENTS

Figure 1:
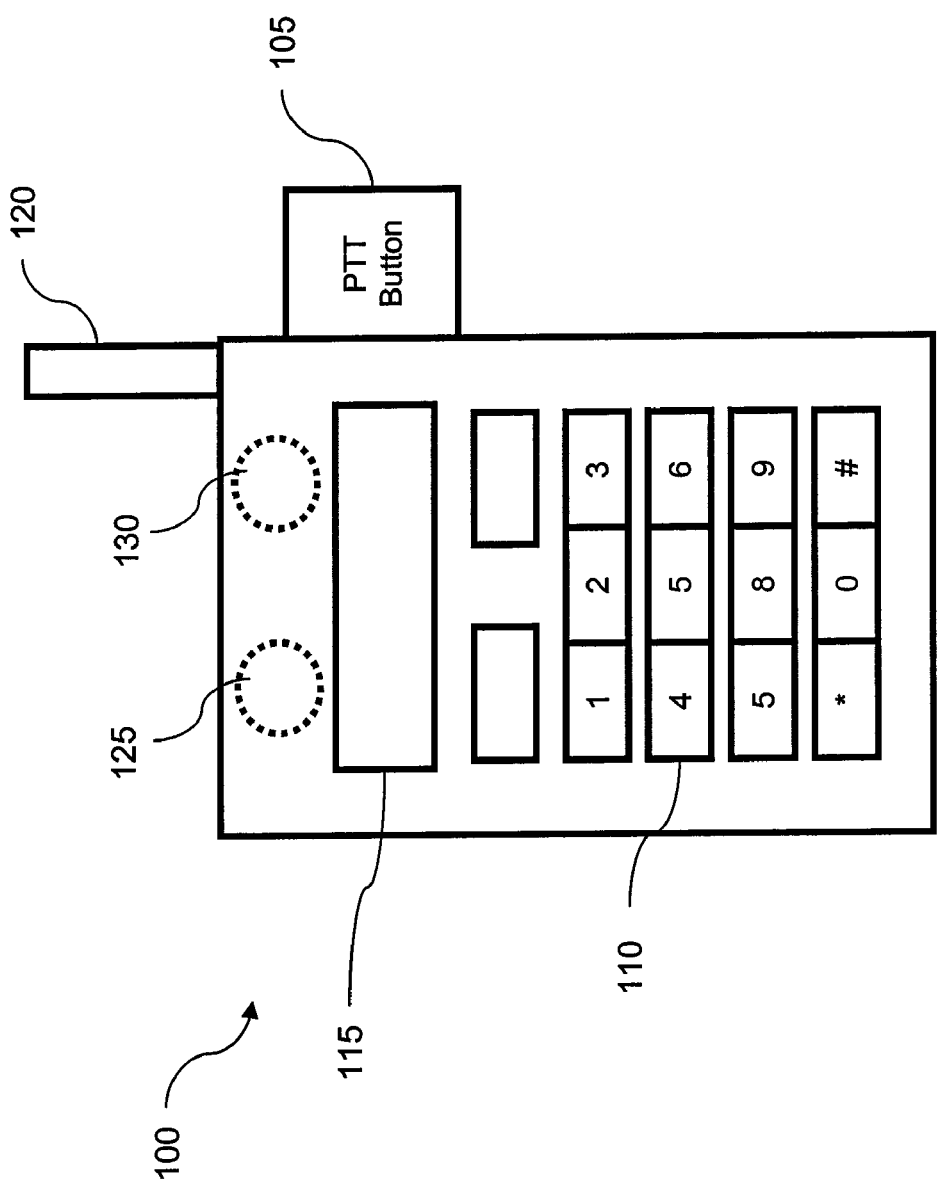
FIG. 1 is diagram illustrating a PTT station in accordance with the present invention.

FIG. 1 illustrates an exemplary push-to-talk communications device in accordance with the present invention. Push-to-talk (PTT) station 100 supports the receiving and sending of wireless communications. PTT station 100 may be a mobile PTT communications device such as a wireless hand held push to talk phone. The user interface for the PTT station 100 includes keypad 110, display 115, speaker 125, microphone 130, and push-to-talk button 105. Keypad 110 includes standard numerical and control keys for inputting or selecting push-to-talk identifiers, text and/or the like. Display 115 provides the visual portion of the interface for the PTT station 100. PTT station 100 also includes a speaker 125 for outputting audio to the user and a microphone 130 for receiving voice input from a user. The push-to-talk button 105 is used to initiate push-to-talk calls and to request the floor of a push-to-talk call. When the floor is granted to PTT station 100, then the user can speak and the speech is transmitted to the other party or parties to the call once the push-to-talk button is released. An antenna 120 connects to an internal radio frequency transceiver to support wireless communications with the PTT station 100.

Figure 2:
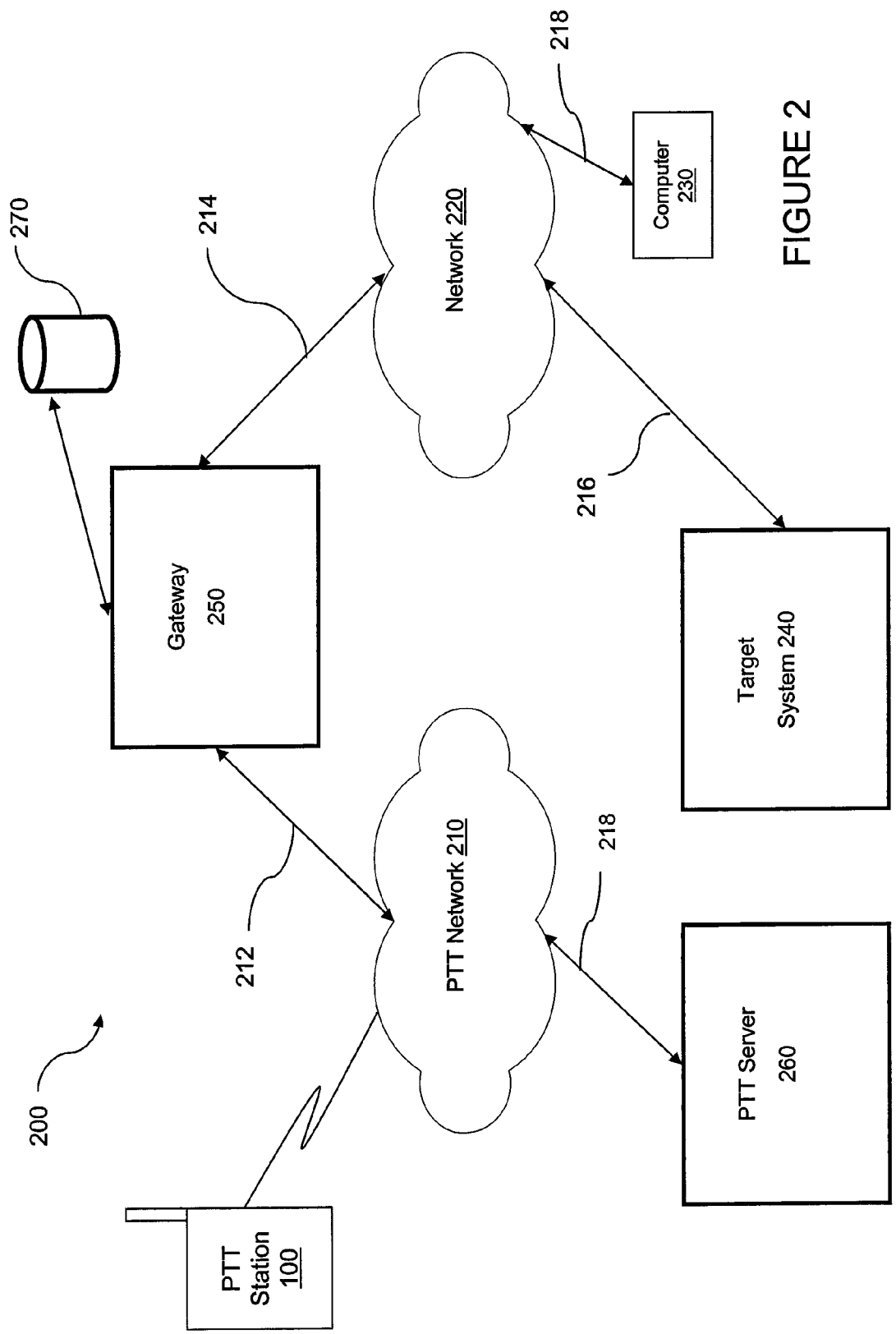
FIG. 2 is a block diagram illustrating a system in accordance with the present invention.

FIG. 2 is a block diagram showing an exemplary system in accordance with the present invention. The system 200 includes a PTT station 100, a push-to-talk network 210, a Gateway 250, a second network 220, a computer 230, a push-to-talk server 260, and a target system 240. The push-to-talk network wirelessly couples to the PTT station 100 to support push-to-talk communications to and from PTT station 100. The PTT server 260 is coupled to the PTT network 210 via communication link 218. The gateway 250 is coupled to the push-to-talk network 210 via communications link 212 and to a second network 220 via communications link 214. Computer 230 and target system 240 are coupled to the second network 220 via links 216 and 218 respectively. An account manager storage device 270 is coupled to the PTT network 210. The account manager storage device 270 may store software programs for implementing logic for carrying out functions of system 200. The account manager storage device also includes areas for storing data associated with the various methods performed by system 200.

Target system 240 is a system to be monitored and/or controlled. Target system 240 includes an interface for communicating over a network 220. For example, network 220 may be a network supporting internet protocol (IP) based communications between the target system 240 and computer 230. The interface for communicating over the network can include a hardware device such as a modem for communicating with the network using a network protocol, and logic for translating native commands for the target system into a format compliant with the network protocol.

By way of example, target system 240 may be a heating ventilation, and air conditioning (HVAC) system that a user intends to control from PTT station 100. Parameters associated with an HVAC system may include the system operating mode (e.g. heating, cooling, manual operation, automatic operation), current parameters such as temperature and humidity in for one or more rooms served by the HVAC system, set points for the system (e.g. maximum temperature and minimum temperature), and the operating condition (e.g. operating, on/off, inoperable) of various system components. Administration of a HVAC system can include querying the system for one or more system parameters, changing one or more parameters, and confirming that a parameter has been set as intended.

Alternatively, the target system 240 may be a security system for the building. In a security system, the corresponding system parameters might be an arming status for the security system (i.e. armed or not armed), an alarming status (e.g. alarming or clear), and status for access points for the building (e.g. locked, open, or unlocked) among other parameters.

Using system 200, target system 240 can be administered using PTT station 100 using methods according to the present invention.

Administration tasks for system 200 include registering users and their target systems to use the system, and billing users for use of the system. A method for registering a target system will be described with reference to FIG. 3. Reference will also be made to the system in FIG. 2.

Figure 3:
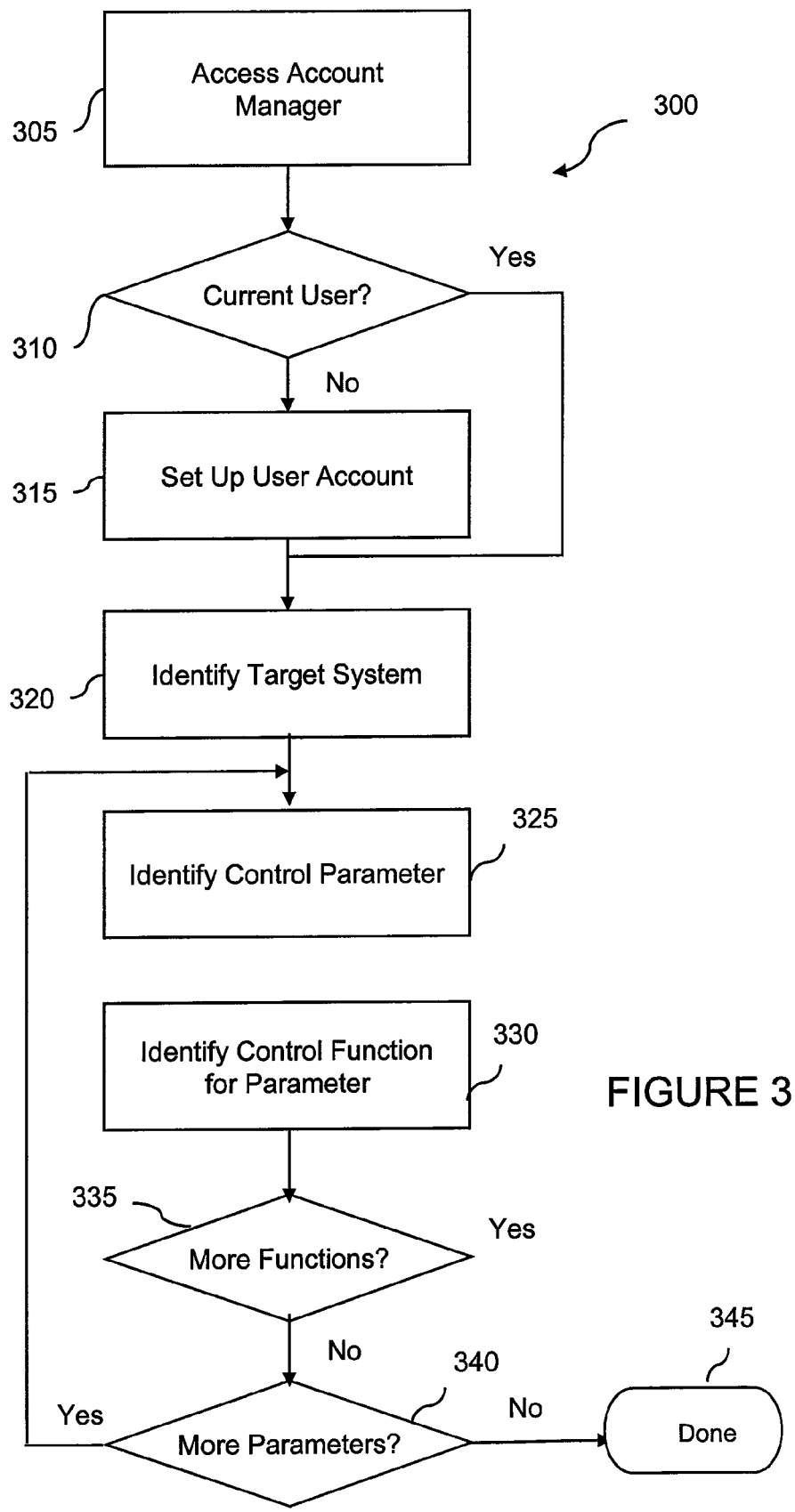
FIG. 3 is a process flow diagram illustrating an exemplary method in accordance with the present invention.

Process 300 shown in FIG. 3 begins at step 305 with accessing the account manager. A user can access the account manager via computer 230, and network 220. Alternatively, a user can access the account manager through a user interface on the user's PTT station 100. The account manager is implemented using logic hosted on a device coupled to the PTT network 210. For example, the account manager logic may be hosted on Gateway 250 or on the PTT Server 260. The account manager logic implements functions such as storing billing information related to a user, and describing the services accessible by the user.

At step 310, the account manager determines whether the user has an account. If the user already has an account, process 300 proceeds along the 'Yes' branch to step 320. If the user does not have an account, process 300 continues via the 'No' branch to step 315 where an account is set up for the user. To set up an account, the user provides the relevant information for controlling a target system 240. The information includes the identifier for the mobile device the user will use with the account. The information may also include billing information that an owner for system 200 can use to bill a user for utilizing the system 200. Once an account is established, process 300 continues at step 320 in which information identifying target systems to be controlled is associated with the account.

For each user account, account information stored by the account manager includes information describing one or more target systems 240 to be controlled by the user, an identifier for communicating with Gateway 250 via a PTT call, and an identifier for communicating with a mobile device via a PTT call. The identifiers for the PTT call are identifiers compatible with the PTT system 210. As a non limiting example, if PTT network 210 is an iDEN® system, the identifiers can be Universal Fleet Mobile Identifiers (UFMI) addresses. Information stored by the account manager may be stored in an account database in an area of the account manager storage device 270.

The account system also stores information describing the target system 240 and enabling communication with the target system 240 over second network 220. At step 320, the user provides the information identifying a target system 240 for control from a PTT station 100. The identifying information includes addressing information and mode information for communicating with the target system via second network 220. The address can use any addressing scheme compatible with the second network. For example, if the second network is an IP network, the target system address can be an IP address, a universal resource identifier (URI), or other address scheme. Where the second network is a telephone switching network, the target system address can be a public switch telephone number. The mode information specifies the particular protocol or protocols, such as TCP, UDP, or Real Time Transport Control Protocol (RTCP) for the communication link between Gateway 250 and the target system 240, as well as the format for communications between Gateway 250 and the target systems to specify the details between the meaning and form of the data transferred between Gateway 250 and target systems 240.

The account manager implements logic allowing the user to identify a target system to be controlled from the user's PTT station 100. For example, the account manager logic may display a user interface on computer 230 allowing the user to select one or more target systems 240 supported by system 200. In one embodiment of the present invention, a list of possible target systems supported by system 200 can be presented to a user on a display of computer 230, and the user can use an input device such as a keyboard or pointing device to select a specific target system 240 to be controlled. For example, computer 230 may display a menu system for selecting one of various types of HVAC systems, security systems, vending machines, or other system types for control.

Following the selection of the target system, the user then identifies one or more parameters to be managed from the system at step 325. For each parameter, the user specifies one or more functions associated with the parameter at step 330. For example, if the target system 240 is an HVAC system, a first control parameter may be the operating mode for (e.g. heating or cooling) for the target system 240. For a given parameter, appropriate target system functions associated with the parameter may be specified. In an example embodiment, when the control parameter is the operating mode, target system functions to be specified, can include reporting the current mode of operation, and setting a new mode of operation.

Process 300 continues at decision block 335 to determine if there are additional functions to be specified for a parameter. If are no more functions to be specified, process 300 continues proceeds to decision block 340 via the 'No' path from block 335. If there are more functions to be specified for the parameter, process 300 returns to step 330 via the 'Yes' path to allow the user to specify additional parameter functions.

At decision block 340, the process determines whether there are additional parameters to be managed for target system 240. If all parameters have been specified, process 300 terminates at step 345 where the account information is stored in account manager database in account manager storage device 270. Otherwise process control returns to step 325 via the 'Yes' path to allow the account manager to collect addition parameters for target system 240.

For each parameter/function pair for a target system 240, account manager logic also establishes methods for communicating with the PTT station 100 and for communicating with the target system 240. The methods for communicating with PTT station 100 are chosen to be compatible with the particular communications device of the user, while the methods for communicating with the target system 240 are chosen from those compatible with the target system. Once the account manager has received a complete description of the target system 240 using process 300, the account manager associates a PTT identifier with the target system 240. The PTT identifier can by supplied by the account manager or input to the account manager by the user. The target system PTT identifier is used to relay communications with the target system from the PTT station 100.

The account manager stores information describing methods for communicating with the target system 240, where the methods are those compatible with a predefined interface for communicating with, querying, and controlling the target system 240 over network 220. The gateway 250 may provide templates that specify predetermined protocols and commands for known target systems. Using the example where network 220 is an IP network, the communication protocol between the gateway and the target system may be via a transmission control protocol (TCP) or user datagram protocol (UDP) sessions between the gateway 250 and the target systems 240 over network 220. Communications between the gateway and the target system may also utilize Short Message Service (SMS), or a proprietary protocol compatible with network 220 and the target system 240.

Figure 4:
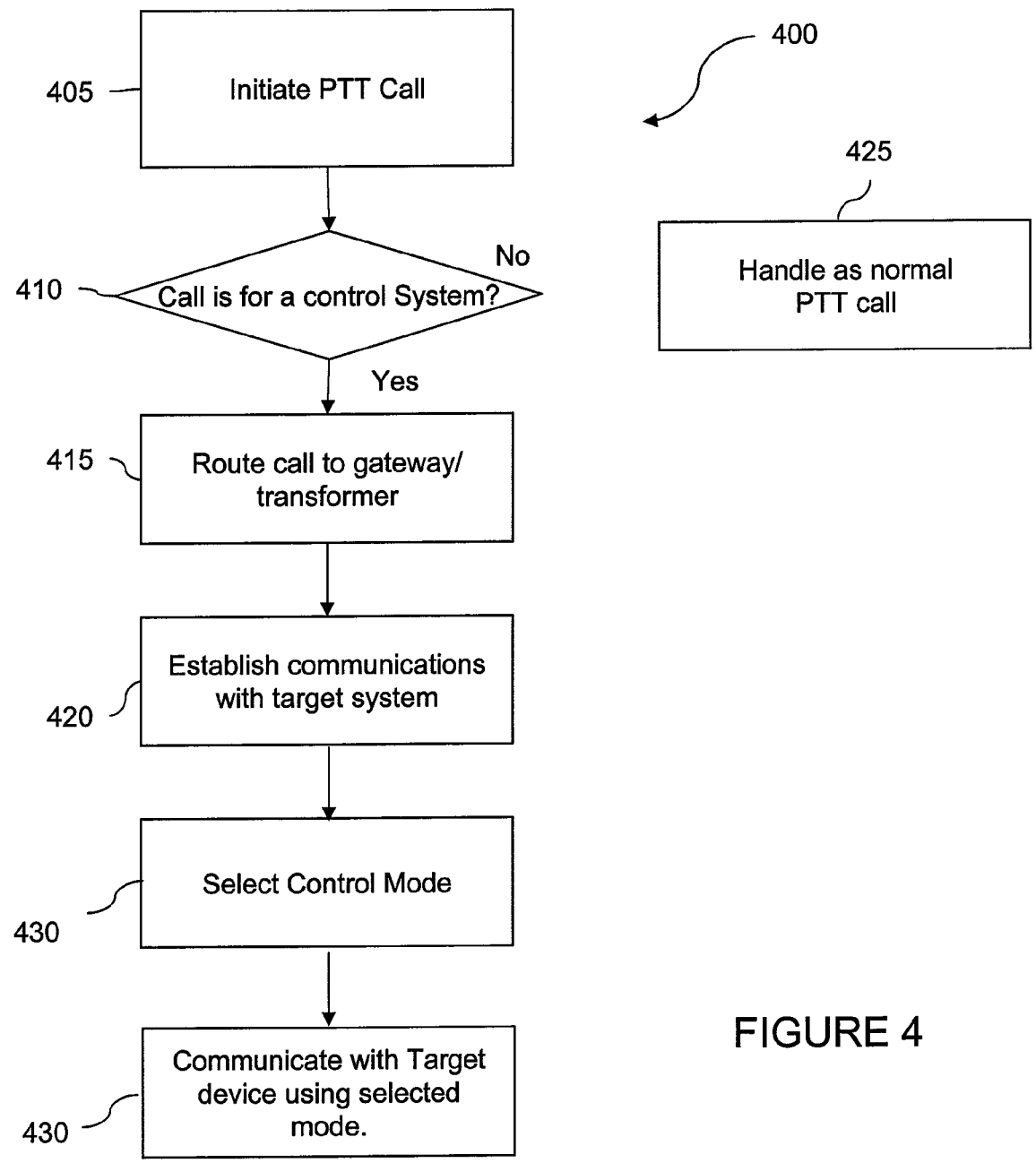
FIG. 4 is a process flow diagram illustrating an exemplary method in accordance with the present invention.

A process for controlling a target system from a PTT communications device will be described using the flow chart in FIG. 4. Reference will also be made to the system illustrated in FIG. 2.

Process 400 begins at block 405 with the initiation of a PTT call for controlling the target system 240 using a PTT established for the target system 240. In initiating the call, PTT station 100 transmits a PTT call initiation request including the originator (PTT station 100) and destination (target system 240) PTT identifiers to PTT server 260 via the PTT network 210. The PTT server 260 implements logic for establishing PTT calls and managing floor control for established PTT calls. When the PTT server 260 determines whether the PTT call request is a request to manage a target system at decision block 410, or is instead a request to establish a PTT call with another PTT station. If the PTT server determines that the PPT call request is a request to manage target system 240, the PTT server establishes a PTT session between the gateway 250 and the PTT station 100 at block 420. Additionally, the PTT server 260 routes the call initiation information routed to Gateway 250. For a managing call, the gateway uses the identifiers for the PTT station 100 and the target system 240 to retrieve the previously stored protocols for managing the target system 240 from the PTT station.

Alternatively, a PTT call alert can be used generate the request to manage the target system 240. For example, PTT station 100 can generate a PTT call alert that includes an identifier for the PTT station and an identifier for the target system 240. A PTT call alert may include additionally include a text message that contains information related to the request to mange the target system.

On the other hand, when PTT server 260 determines at decision block 410 that the PTT request is not a request to manage a target system, process control is transferred to block 425 and the PTT server executes logic for establishing a PTT call between the PTT station 100 and the requested destination (such as another PTT communications device or a group of communications devices).

Returning to the circumstance where the PTT server 260 identifies a request to manage a target system 240, process 400 continues at block 420 wherein Gateway 250 establishes communications with the target system 240 using a protocol appropriate for network 220 and target system 240.

Upon successful connection to the target system, the gateway transmits an indication that the communications sessions for controlling the target device have been successfully set up.

Process control for process 400 then continues from block 430 to select a control mode for communications over the PTT session between the PTT station 100 and Gateway 250. The selected mode is chosen to be a mode supported by the capabilities of the PTT station 100 employed by the user. Where the user's PTT station 100 supports multiple modes, an appropriate mode can be selected from one of the available modes.

Figure 5:
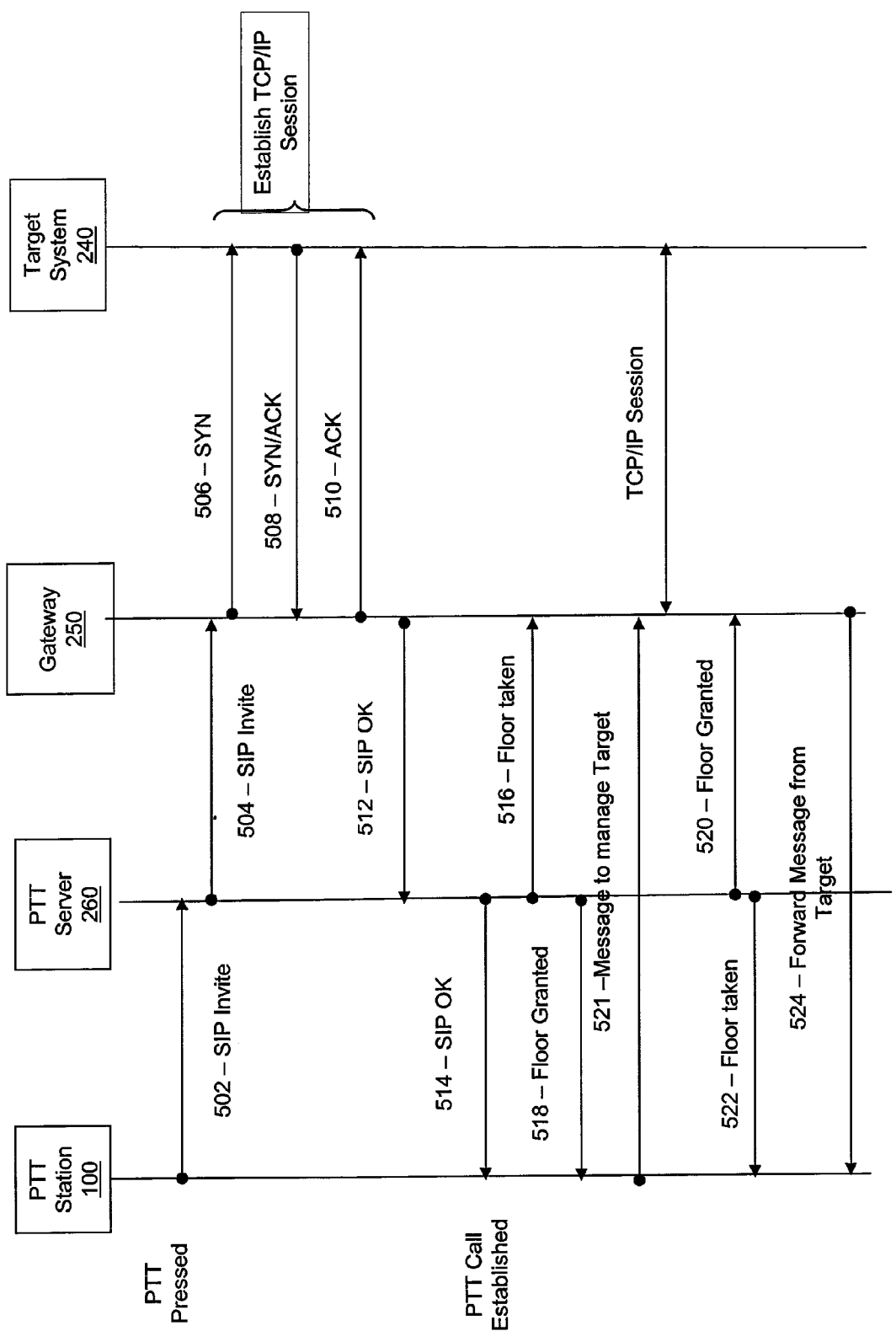
FIG. 5 is a call flow diagram illustrating messaging for establishing communications session in accordance with the present invention.

FIG. 5, illustrates a call flow for establishing a connection with between a PTT mobile device and a target system 240. FIG. 5 illustrates the case where the target system 240 connects to network 220 via a TCP over IP (TCP/IP) session. The message flow diagram in FIG. 5 will be described with additional reference to FIGS. 1 and 2.

A PTT call for controlling the target system 240 is initiated at PTT station 100 by selecting the target system 240 and pressing the push-to-talk button 105. The target system 240 is selected by retrieving a contact list on the phone that includes an entry for the target system 240 or by entering an identifier for the target system 240 from the keypad 110.

In response to selecting the target system and pressing the PTT button 105, PTT station 100 transmits a call invitation message 502 to the PTT server. As illustrated in FIG. 5, the call invitation message is a Session Initiation Protocol (SIP) Invite message. The use of SIP messages is for illustration purposes only, and the system need not use SIP messaging to set up the PTT call. For example, where PTT network 210 uses the iDEN® protocol, the call invitation message 502 can be an iDEN® call invitation message.

The call invitation message includes a source identifier that identifies the user's PTT station 100, and a destination identifier for the target system 240. The PTT server 260 receives the SIP invite message 502 and logic on the PTT server 260 determines whether the invite message is for initiating a management system with a target system. The determination can be made by examining one or both the destination and source identifiers within the invite message 520. If the SIP invite message 502 includes a text message (e.g. a message provided with a PTT call alert), information within the text message may also be used to determine whether the request is intended to manage a target system. If the logic determines that SIP invite message 502 is a request to manage target system 240, PTT server 260 transmits second SIP invite message 504 to Gateway 250. The second SIP invite message 504 includes the source and destination address information from first SIP invite message 502.

Upon receipt of the second SIP invite message 504, Gateway 250 uses the source and destination information to retrieve account information from account database on storage device 270 related to the management session between for the target system 240. Using the retrieved account information Gateway 250 determines the details of the communication modes for communications between the PTT communication mobile device and Gateway 250 and for communications between Gateway 250 and the target system 240.

In the example shown in FIG. 5, the account information indicates that the target system communicates using a (Transmission Control Protocol over IP) TCP/IP session. Accordingly, Gateway 250 logic and the target system 240 logic exchange 3-way handshake messages for establishing a TCP/IP session. The Gateway 250 determines the IP address of the target system and transmits a SYN 506 message to the target system 240 using network 220. The SYN message 506 includes a TCP/IP compatible source address and source port information for Gateway 250 and TCP/IP compatible source destination address and destination port information for the target system. Logic associated with the target system responds to SYN message 506 by transmitting SYN/ACK message 508 to Gateway 250 over network 220. Gateway can also transmit messages back to the PTT station 100 via PTT server 260 (such as SIP trying or SIP ringing) to indicate that formation of a communication session between Gateway 250 and the target system 240 is in progress.

Upon receiving the SYN/ACK message 508, Gateway 250 completes the 3-way handshake by transmitting an ACK message to target system 240. Upon completion of the 3-way handshake, a TCP/IP session is established between Gateway 250 and the target system 240. In addition, Gateway 250 sends SIP OK message 512 to the PTT Server to PTT server OK to signal that Gateway is ready to communication with the PTT station 100 using a PTT call. The PTT server 260 completes the initiation of the PTT call by transmitting SIP OK message 514 to PTT station 100.

After the SIP OK message 514 is received, the PTT session between Gateway 250 and the PTT station 100 is established. The PTT server 260 manages the floor of the communication system. To allow the PTT station 100 to transmit commands for controlling the target system 240, the PTT transmits the floor granted message 518 to the mobile device and transmits the floor taken 516 to Gateway 250. Once the PTT station has the floor, the PTT station can transmit messages 521 to the gateway 250 for managing the target system 240. To allow the PTT station 100 to receive reply messages from the target system 240, the PTT server transmits a floor taken message 522 to the mobile device and a floor granted message to Gateway 250. The gateway 250 can then forward message 524 containing information received from the target system, but converted to a format usable over the connection between the PTT station and the gateway 250. The Gateway 250 can buffer messages received from the target system when Gateway 250 does not have the floor of the PTT session with the PTT station 100.

Note that the PTT station 100 can operate in the above system without contain logic for implementing a TCP/IP session with the target system 240 or logic for formatting messages for controlling target system. Instead the PTT station 100 establishes a PTT session with a Gateway. Gateway 250 connects to the target system using the protocol required by the target system and performs the mapping and translation between the signaling capabilities of the PTT station 100 to and the commands modes for the target system 240. The Gateway 250 also handles the translation between addressing protocols used by the PTT station 100 and the target system.

The discussion above describes the details for establishing a connection between Gateway 250 and the target system 240 using TCP/IP as the addressing and transmission protocol. Using this protocol, messages for controlling the target system 240 and for reporting the condition of the target system 240 may be exchanged between Gateway 250 and the target system 240 in a variety of formats including binary data, text, discrete tones, or voice. The format for transmitting the data and the interpretation of the data as commands and values associated with the control system collectively represent the message format for communications between Gateway 250 and the target system 240. The invention is not limited to being practiced using TCP/IP sessions as the protocol. Further, the format of messages exchanged between Gateway 250 and the PTT station 100 can differ from the format of messages exchanged between the target system 240 and Gateway 250. Gateway 250 handles translates messages to the format expected by the recipient (i.e. PTT station 100 or Gateway 250) when relaying messages between the PTT station 100 and Gateway 250.

For example, Short Message System (SMS) may be exchanged between Gateway 250 and the target system 240. SMS can directly support the transfer of messages of up to 160 characters, where each of the 160 characters chosen from a 7-bit alphabet. The 7-bit alphabet directly supports the transmission of text strings between using SMS. Alternatively, SMS messages may be concatenated to transmit longer strings of characters between systems.

Alternatively, UDP/IP sessions can also be used as the protocol for communications between the target system 240, and Gateway 250.

Referring to FIG. 1, a PTT station 100 may support one or more control signaling formats for transmitting commands to the gateway 250 using a PTT call. For example, the signaling formats can include a voice command mode, a signal patterns mode, a tones/sounds mode, a data over PTT channel mode, and a voice/data communication. The signal format may be selected based on a choice made at the time of registering with the account manager and retrieved at the time of setting up the PTT call. Alternatively, the signaling mode can be changed during a session for controlling a target system 240 to one or more modes registered with the account manager and compatible with PTT station 100.

The voice command mode uses the voice transmission facilities of the PTT station 100. Gateway 250 transforms information received from the target system into voice command using text to speech software, or by selecting pre-recorded messages. When using voice commands, a user can transmit a call by requesting the floor of the PTT call by pressing the PTT button 105 of the PTT station 100 and speaking into the microphone of the PTT station 100. When the PTT server 260 grants the user the floor of the PTT call, the voice command can be transmitted to Gateway 250. Logic on Gateway 250 implements voice recognition software that translates the transmitted voice command form the user into a control command recognizable by Gateway 250. Gateway 250 can also facilitate communication from the target system 240 by translating messages in a format such as text, binary, or tones from the target system 240 to voice commands, and transmitting voice commands from Gateway to the PTT station 100 by requesting the floor of the PTT call from the PTT server 260, and transmitting the translated speech response to the PTT station 100 upon being granted the floor.

For example, if the target system is an HVAC system, gateway can assume the floor to transmit an initial voice message that confirms that the user is connected to the user's heating and air conditioning system and asks if the user wants the current system status for the HVAC system before yielding the floor of the PTT call with PTT station 100. If the user takes the floor of the call to transmit a "Yes" voice message, Gateway uses a TCP/IP session or other appropriate communications protocol to obtain systems status from the target device 240 over network 220. Because the user has elected to simply report system status and is not modifying the target system 240, the system 200 can omit a step of confirming the command to the user prior to transmitting the command to the target system.

On the other hand, if the user transmits a voice message indicating "No", Gateway may transmit a voice mail message asking the user an option to the user to set the HVAC system to "cooling mode". If the user responds "Yes" to this message, Gateway can transmit a second message to the PTT station 100 directing that the user to confirm he command to set the HVAC mode to "cool." When the user confirms the desire to set the HVAC system mode to "cooling mode" by speaking "Yes" a second time, Gateway then transmits the appropriate command over network 220 to set the target system 240 to "cooling mode". Upon receiving a response from the target system 240 that the system mode has been changed, Gateway assumes the floor of the PTT call to notify the user that the HVAC system is in "cooling mode." On the other hand, if the command to the HVAC system is not confirmed within a predetermined time, Gateway may either repeat the request for confirmation or presume that the initial command was in error, and proceed to the provide additional control options.

With regard to the communications formats for communications between the PTT station 100, and Gateway 250, a signal patterns communication mode can be implemented wherein the user operates toggles the PTT button 105 of the PTT station 100 to transmit patterns to Gateway 250. As described above, the PTT network 210 recognizes from the origination and destination identifiers for the PTT call, that a request for call for managing a target system has been received. Accordingly, the PTT network may implement modifications to the floor control logic to allow the user to signal the system by pressing and releasing the PTT button 105.

Figure 6:
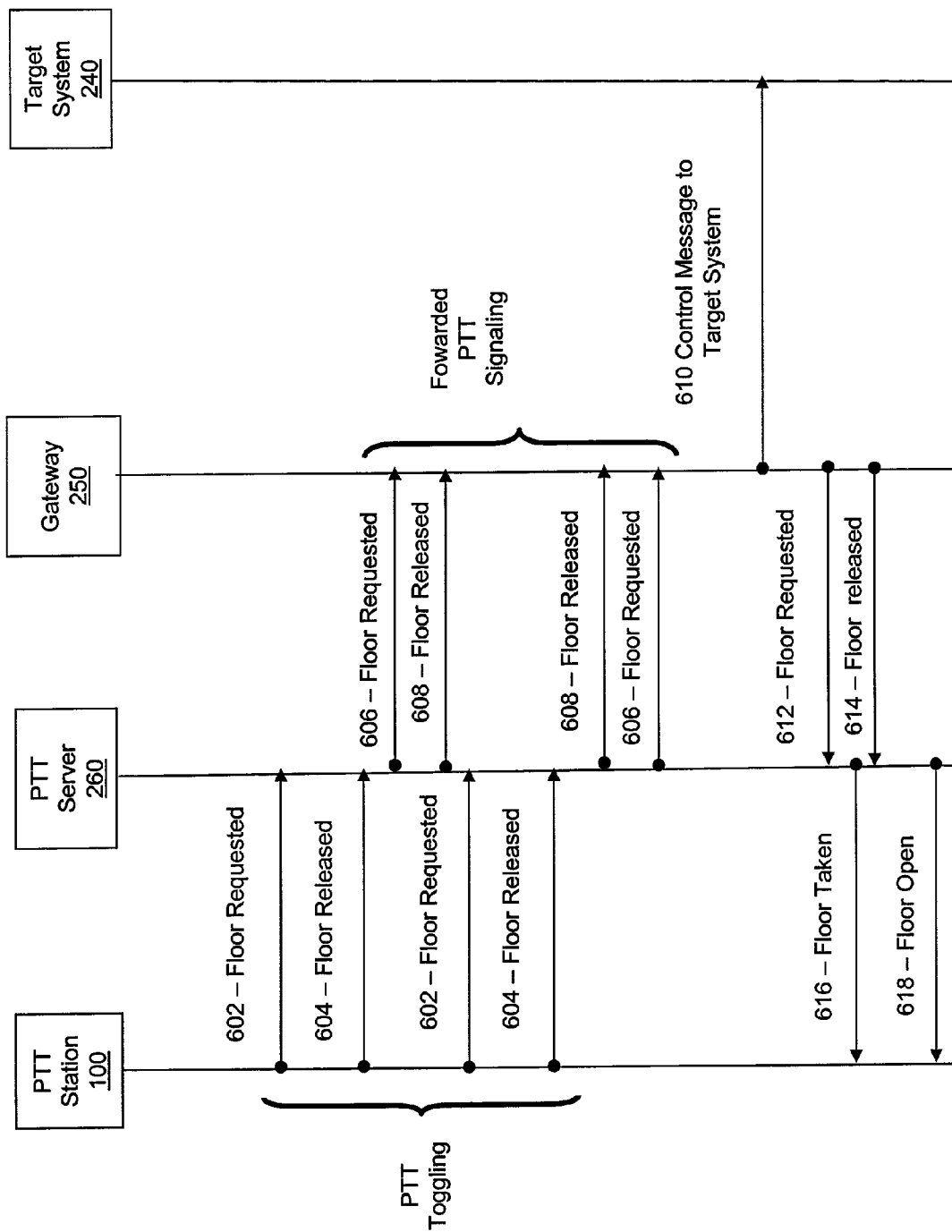
FIG. 6 is a call flow diagram illustrating PTT button signaling in accordance with the present invention.

Referring to FIG. 6, it can be appreciated that when the PTT button 105 is toggled (pressed and released) within a predetermined time period, PTT server 260 can recognize the sequence of operations of the PTT button as a signal to manage the target system 240 rather than as a request for the floor of the PTT call. The sequence of floor request and floor release messages 602 and 604 can then be forwarded as floor request and floor release messages 606 and 608 for recognition by Gateway 250. For example, a simple pulse count can be mapped to a command for a target system 240 by Gateway 250. Alternatively, more complex patterns of toggles of the PTT button 105 can signal more complex commands. For example, the number '23' can be signaled by a toggling to produce a first sequences of 'two pulses' in rapid succession followed by a second group of 'three pulses' in rapid succession. Gateway 250 then translates the pattern of toggles into an appropriate command or data and then generates and transmits message 610 to the target system 240 using an appropriate format and protocol.

By using PTT button toggle signaling, the user can dispense with voice message prompts and use a PTT button signaling mode to communicate with Gateway 250. For example, once a PTT call between Gateway 250 and PTT station 100 has been established, the user can interrupt a voice message by pressing the PTT a predetermined number of times within a predetermined time interval. For example three rapid presses and releases of the PTT button made during a voice communication from Gateway 250 can indicate that the user intends to use the signaling control method rather than the voice control method.

The signal patterns communications mode described above can also be used by Gateway 250 to communicate with the PTT station. When the floor of a PTT call is available, a PTT station participating in the call emits a characteristic tone, (for example a "chirp") that indicates that the floor is available. Accordingly, Gateway 250 can transmit messages to PTT station 100 by using the "toggling" signal method described above. For each signal toggle by Gateway 250, Gateway 250 transmits a floor request message 612 followed by a floor release message 614. The PTT server grants the floor of the PTT call to Gateway 250 and transmits a floor taken message 616 to PTT station 100 in response to floor request message 612, and then releases the floor and transmitting the floor open message 618 to the PTT client in response to the floor release message 614 from Gateway 250. PTT client 100 responds to the floor open message 618 by producing the characteristic tone. Sequences of these tones can be used to convey information about the target system 240 to the user of PTT station 100 from Gateway 250 in ways identical to those described above for communications from the PTT station 100 to Gateway 250.

The methods described above use only those features that are associated with a basic PTT station. Alternatively, a PTT station can contain logic for implementing a graphical user interface on the PTT station display. The enhanced PTT station can be used in place of PTT station 100 to carry out any of the functions described above and illustrated in FIGS. 2 through 6.

Figure 7:
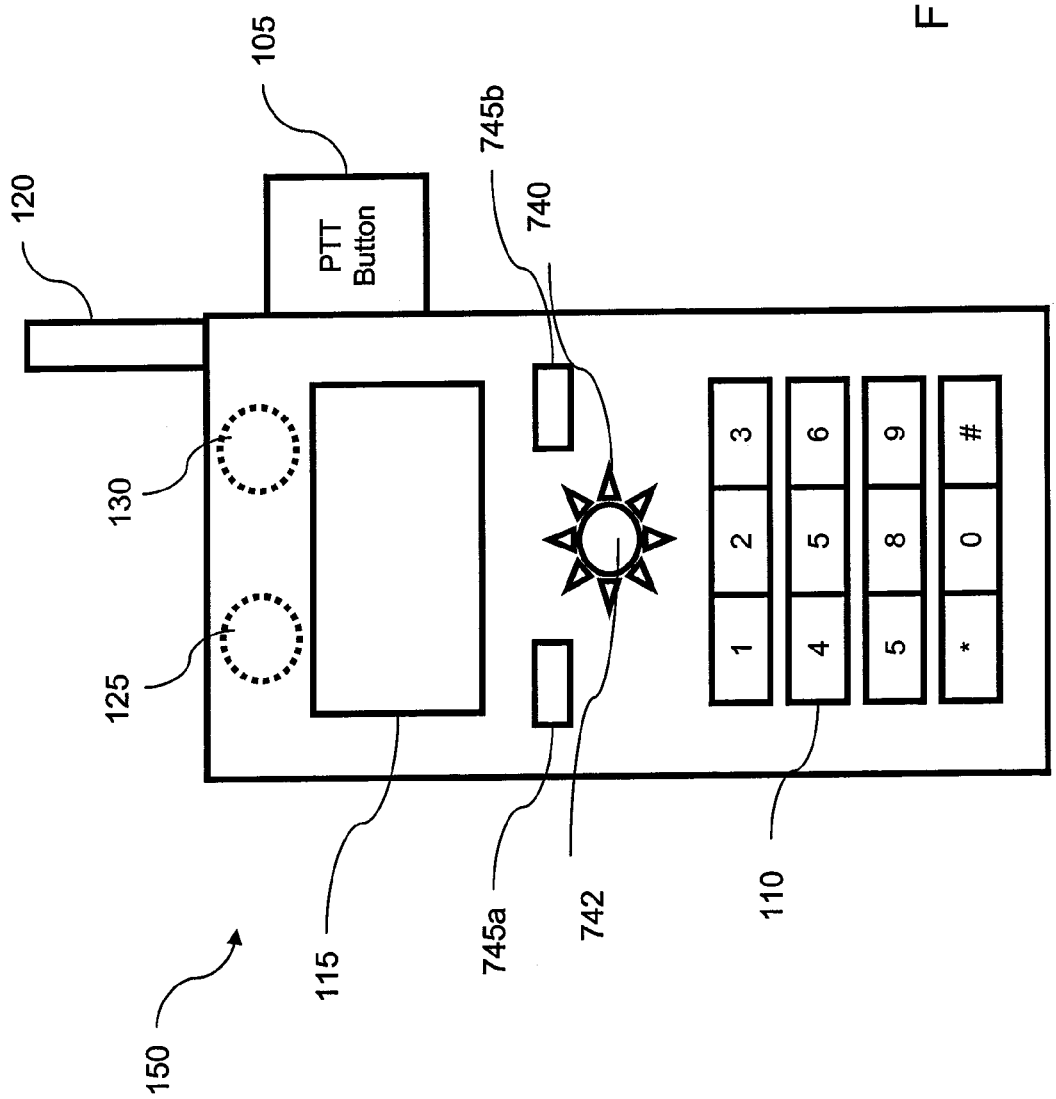
FIG. 7 is a diagram illustrating another PTT station in accordance with the present invention.

FIG. 7 shows an example PTT station 150 that includes a graphic user interface unit that hosts logic that allow the user to display a graphical user interface (GUI) for controlling facilities of a target system. Features of PTT station 150 having the same reference numbers as features shown in FIG. 1 have similar functionality, and the description of such features is omitted for clarity. PTT station 150 includes a navigation input device having actuators 740 for navigating through menus of a graphical user interface displayed on the display 115 of PTT station 100. By activating a corresponding one of the activating positions, a user can move left, right, up, or down to highlight an item from a menu. The navigation input device may includes a center control 742 which when activated registers a user's selection of an item highlighted in displayed menu. Mobile station 150 also includes one or more buttons 745a and 745b. The PTT station 150 includes a control unit that host logic to perform specific functions upon operation of these buttons by a user. The specific controls and arrangement of controls for navigating, selecting, and operating the user interface is only an example, and the invention is not limited to the described arrangement.

Figure 8:
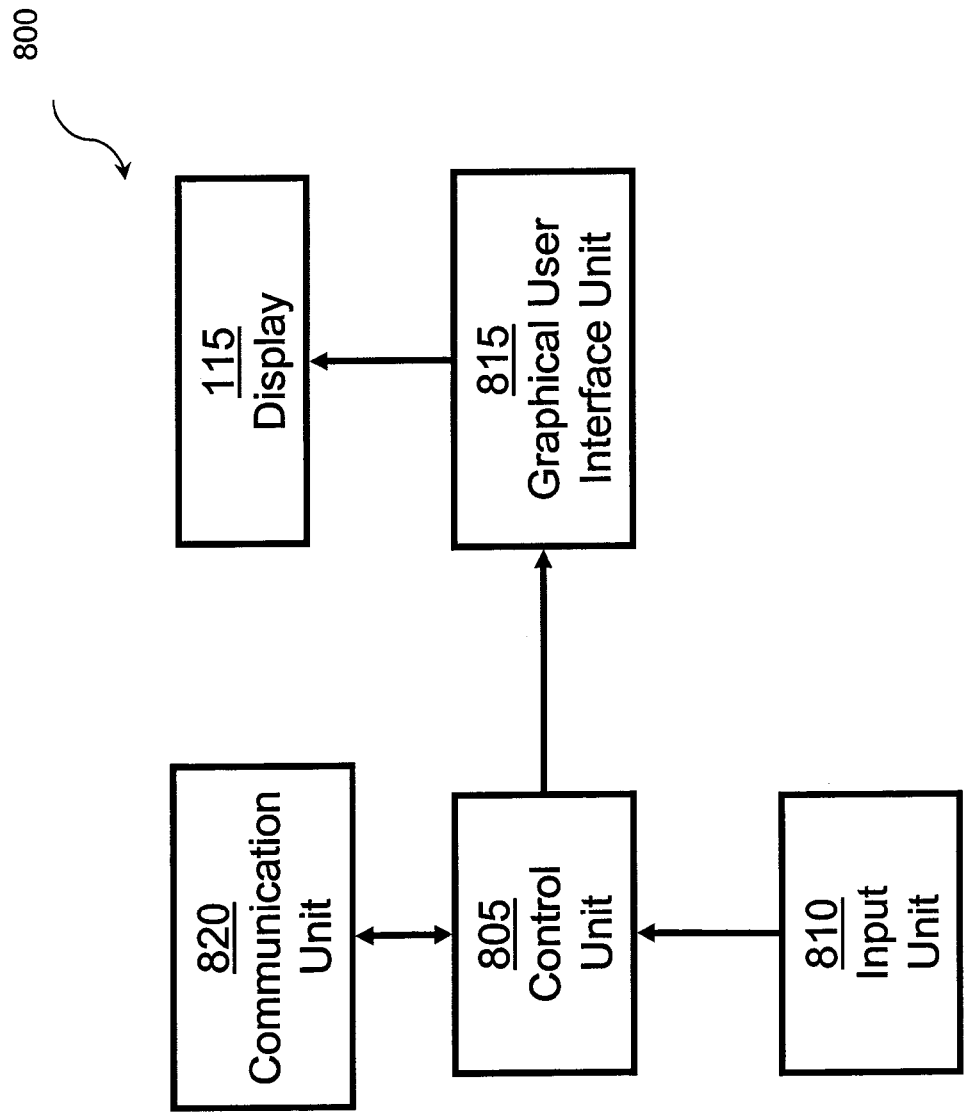
FIG. 8 is a block diagram illustrating the logic implemented on the PTT station of FIG. 7.

FIG. 8 illustrates the control system for PTT station 150. The components of the control system host logic for carrying implementing a graphical user interface on the PTT station 150 and for managing a target system from the PTT station 150. The control system includes an input unit 810 that receives user input from the PTT station, a graphical user interface unit 815 connected to the display 115 of the PTT station 150, and a communication unit 820 that controls the wireless transmitter and receiver of the PTT station 150. The control unit 805 is connected to communications unit 820, the graphical user interface unit 815, and the input unit 810 and manages the overall operations of the control system based on information received from the other components of the control system. The control unit 805 receives user commands via the input unit 810 from the keypad 110, and the various other controls and buttons (e.g. actuators 742, 745a, and 745b) implemented on PTT station 150.

Figure 9A:
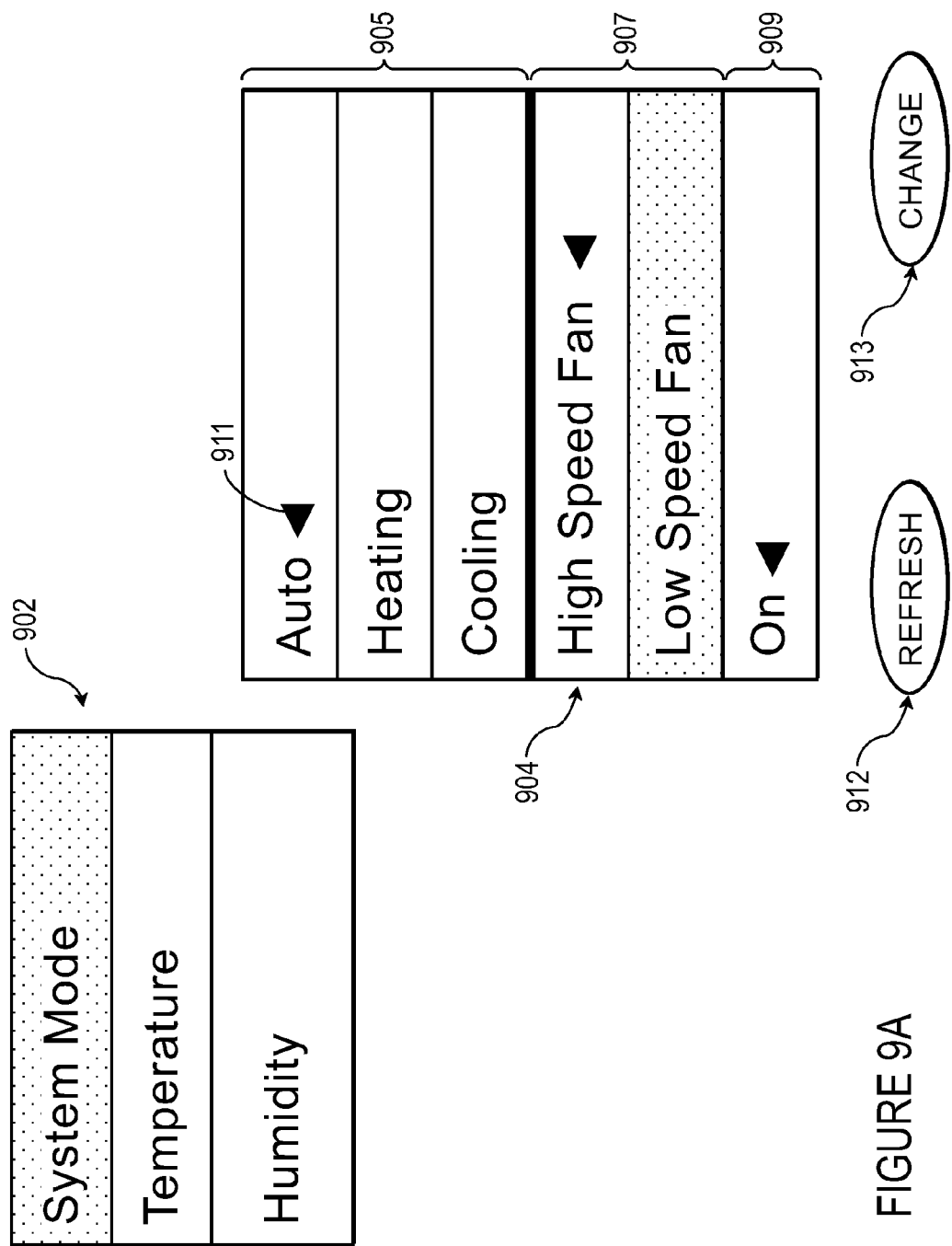
FIGS. 9A and 9B illustrate displays for a graphical user interface for use with mobile device of FIG. 7 in accordance with the present invention.

For example, after a user has established connections between PTT station 150 and Gateway 250, and between Gateway 250 and the target system, logic hosted on the control unit 805 directs the graphical user interface unit 815 display an entry menu of a graphically user interface on display 115 of PTT station 150. FIG. 9A shows an example main menu 902 for controlling a home heating, ventilation, and air conditioning (HVAC) system as the target system 240. Main Menu 902 includes a "System Mode" option for accessing logic to managing modes of operation of system components of the target HVAC system from PTT station 150. Main Menu 902 also includes a "Temperature" option for accessing logic to manage temperatures from PTT station 150, and a "Humidity" option for managing humidity values and set points associated with the target HVAC system.

Using the navigation input device actuators 740, a user may highlight any one of the menu options from menu 902, and can select a highlighted item using control 742. The control unit 805 receives the user's input via input unit 810 and determines which option the user has selected. For example, FIG. 7A illustrates the condition in which the user has highlighted the system mode in menu 902. As a result, the control unit 805 directs the graphical user interface unit 815 to display a second menu 904 on the display 115.

Prior to the display of menu 904, and in response to selecting "System Mode" from menu 902, the control unit 805 uses the communication unit 820 to communicate with the target system 240 via Gateway 250. Logic on the control unit transmits a request to the target system 240 to determine the current operating system mode values. Once a message or messages containing these operating system mode values have been received via the communications unit 820 using the communication methods described elsewhere in this application, the control unit 805 directs the graphical user interface unit to display the target system parameters in menu 904. The arrows 911 are placed on the items of the respective menu sections to indicate the current mode of the target HVAC system.

Menu 904 includes several menu sections including menu section 905 related to the temperature control mode of the HVAC system, menu section 907 related to the fan speed of the HVAC system, and menu section 909. In each menu section, an arrow 911 is displayed to indicate the current mode of the target HVAC system.

For example, menu 904 as displayed in FIG. 9A indicates that the target HVAC system is currently operating in an "Auto" mode in which the system automatically selects cooling or heating, with the central system fan in high speed, and that the target HVAC system is currently turned "On".

Menu 904 also includes left and right soft labels 912 and 913 which describe the operations which will be performed by operating the corresponding left and right buttons 745a and 745b. The control unit 805 directs the graphical user interface unit to set the text displayed with soft labels 912 and 913 be appropriate for the functions that can be selected for a given menu, and can be changed for individual sections of a menu. For example, in menu 904, the text of the left soft label 912 is "REFRESH" and operating the left button 745a will result in the PTT station communicating with the target system 240 via Gateway 250 to request the current system mode parameters for the target system. On the other hand, by the text of the right soft label 913 is "CHANGE" indicating that the operating the right button 745b will result in changing the selected system mode parameter to a new value. For example, in menu 904 an arrow 911 indicates that the fan is currently in the high speed mode, while the low speed mode is currently high lighted in the menu. Accordingly, upon actuating the right button 745b, the PTT station 150 will communicate with the target system through Gateway 250 to change the mode of the fan to slow speed.

Figure 9B:
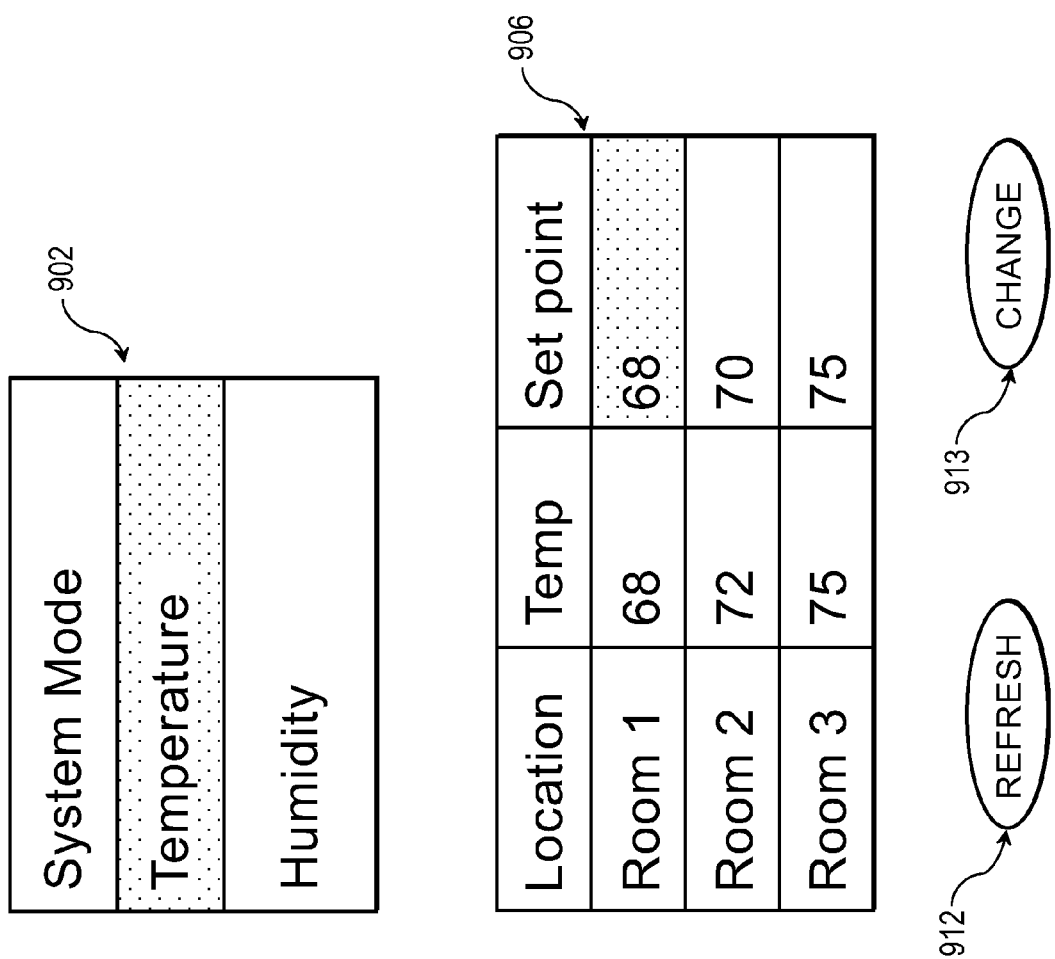

FIG. 9B shows main menu 902 in the case where "Temperature" is highlighted. When the highlighted item is selected, by for example, actuating center control 742, the control unit 805 uses the communication unit 820 to communicate with target system 240 via gateway to obtain the current values of temperatures of the HVAC system.

Once the PTT station has received the values for parameters associated with the target HVAC system in response to the selection of "Temperature from main menu 902, menu 906 is displayed. Menu 906 displays the temperatures and set points for each room serviced by the target HVAC system.

The user of PTT station 150 can highlight any of the values displayed in menu 906 using navigation input device actuators 740. When a set point temperature is highlighted, both the "REFRESH" soft label 912 and the "CHANGE" soft label 913 are displayed because the set point parameter can be both reported to the user and changed by the user. However, when a room temperature value is displayed, the "Refresh" soft label is displayed allowing the user to obtain the current value for the parameter, but the "Change" soft label can be omitted indicating that the user does not have the ability to change the value for this parameter.

As an example, in FIG. 9B, the set point temperature for Room 1 is highlighted. The user can change the value for this parameter using by entering a new value using keypad 110. Once the PTT station receives input from the user specifying a new value for the set point of Room 1, and input from the user directing the PTT station to change the set point to the new value, for example by actuating left button 745*b* corresponding to left soft label 913, PTT station 150 communicates with the target HVAC system via Gateway 250 to change the temperature set point for room 1 to the new value specified by the user. Optionally, the PTT station can receive a confirmation from the target system that the set point of the target system has been changed, and can update the display on menu 906 to indicate the confirmed value.

Additionally, by hosting user interface logic on the PTT station 150, additional options for transmitting commands and receiving information from a target system via Gateway system are possible. For example, in addition to the voice commands, tones, and PTT toggle signaling methods described above, logic hosted on the PTT stations can transmit commands in a data format over a PTT call between Gateway 250 and the PTT station 100. Alternatively, patterns of audio tones other than those available using the DTMF system associated with the keypad can be used to communicate with Gateway 250. By using logic to generate and recognize binary data or tones transmitted between PTT station 100 and Gateway 250, communications between these components can be more accurately and rapidly completed than when the commands are generated and interpreted manually by the user of the PTT station.

When the PTT toggle signaling mode is used with the GUI to transmit with tones, a user does not need to actually toggle the PTT button. Instead, the logic on the graphical user interface can transmit pairs of floor request/floor release messages (messages 606 and 604) to the PTT server to simulate a toggle of the PTT button.

In the above description, components such as the wireless PTT station, the computer, Gateway, and the PTT server have been described as carrying out processes and methods, and as performing functions such as making determinations, storing information, and generating, transmitting and receiving messages and implementing logic. For the purpose of performing these and other operations, the location server, application server, computer, and location server database may include processors such as a microprocessor for executing instructions. Each processor executes the relevant instructions retrieved from a computer readable memory that cause the computers to carry out the relevant operations. The computer-readable memory may include a hard drive, random access memory (RAM), read only memory, or other memory readable by and coupled to the processor.

Alternatively, operations described above can be implemented in hardware using electrical circuitry arranged as logic for carrying out the described operations. A combination of hardware and computers with computer readable instructions can be used to carry out the described operations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for communicating with a target system, the method comprising:
   receiving a request to manage a target system from a push-to-talk (PTT) station, the request including an identifier for the push-to-talk (PTT) station and an identifier for the target system;
   establishing a push-to-talk call between a gateway and the push-to-talk (PTT) station in response to the request;
   determining a protocol for communicating with the target system based on the request;
   determining a message format for communicating with the target system using the protocol using the request;
   establishing a communications link using the determined protocol;
   receiving a signal indicating a count of toggles of a push-to-talk button on the push-to-talk (PTT) station over a predetermined interval;
   translating the number of counted toggles into a command message corresponding to the count having the predetermined format; and
   transmitting the command message corresponding to the count to the target system using the predetermined protocol.

2. The method of claim 1, further comprising:
   receiving data from the target system;
   requesting the grant of the floor of the push-to-talk call to the gateway in response to the receipt of the data;
   receiving a message indicating the grant of the floor to the gateway in response to the request for the floor; and
   translating a format of the data from the target system into a format usable over the push-to-talk call.

3. The method of claim 2, further comprising:
   transmitting the translated data from the target system to the push-to-talk (PTT) station in response to the message indicating grant of the floor of the push-to-talk call to the gateway; and
   releasing the floor of the push-to-talk call upon completion of the transmitting of the translated message.

4. The method of claim 1, further comprising:
   receiving a voice command specifying a target operation to be performed on the target system using the established push-to-talk call;
   translating the voice command into a message corresponding to the target operation in the determined message format for communicating with the target system.

5. The method of claim 4, wherein the receiving a voice command comprises:
   granting a request for the floor of the push-to-talk call to the push-to-talk (PTT) station; and
   receiving a voice command transmitted from the push-to-talk (PTT) station.

6. The method of claim 4, further comprising:
   translating the target operation into a voice message describing the target operation and transmitting the voice message to the push-to-talk (PTT) station.

7. The method of claim 1, further comprising:
   receiving a status message from the target system by the gateway including an identifier for the target system; and
   transmitting a dispatch alert message from the gateway to the push-to-talk (PTT) station including an identifier based on the identifier for the target system included in the status message.

8. The method of claim 1, further comprising:
   receiving an audio signal from the push-to-talk (PTT) station;

identifying frequencies in the audio signal and translating the identified frequencies into a command message for the target system having the predetermined format; and transmitting the command message corresponding to identified frequencies to the target station using the predetermined protocol.

9. A method for communicating with a target system, the method comprising:

receiving a first identifier for a push-to-talk (PTT) station;

receiving a first identifier for a target system to be controlled from the push-to-talk (PTT) station;

receiving a description of first message content to be transmitted from the push-to-talk (PTT) station;

identifying the format and content of a second message corresponding to the first message to be transmitted to the target system; and storing a correspondence with the first message content and the second message format and content in an account corresponding to the first identifier.

10. The method of claim 9, wherein the stored correspondence further includes information specifying a protocol for connecting to the target system.

11. The method of claim 9, further comprising:

receiving a message including the first identifier and the second identifier from the push-to-talk (PTT) station, and a description of a command for the target system;

accessing the account keyed to the first identifier; and translating the description of the command for the target system into a command message having the format and content corresponding to a correspondence stored in the account keyed to the first identifier.

12. The method of claim 11, further comprising:

retrieving a protocol for communicating with the target system using the first identifier and establishing a communication session between the target system and a Gateway using the retrieved protocol; and transmitting the translated message from the gateway to the target system, wherein receiving a message including the first identifier and the second includes establishing a push-to-talk call between the push-to-talk (PTT) station and the gateway.

13. The method of claim 12, wherein establishing a communication session between the target system and a Gateway includes establishing a Transport Control Protocol over IP session between the gateway and the target system.

14. A push-to-talk (PTT) station for managing a target system comprising:

an input unit for receiving user command managing the target system;

a communications unit for transmitting and receiving communications with a gateway connected to the target system;

a control unit that receives a request to manage a target system from the push-to-talk (PTT) station using the input unit and that generates a request including an identifier for the push-to-talk (PTT) station and an identifier for the target system, and transmits the request to manage the target system to the gateway; and a graphical user interface unit that provides a graphical user interface on a display of the PTT station for managing the target system, wherein in response to receiving the request, the control unit determines a protocol for establishing a link between the gateway and the target system and transmits a message to the gateway that establishes a PTT session between the control unit and the gateway, and that establishes a communication link between the gateway and the target system using the determined protocol.

\* \* \* \* \*